United States Patent [19]

Sutz

[11] Patent Number: 4,507,060
[45] Date of Patent: Mar. 26, 1985

[54] PUSH-PULL WINDMILL HEAD HAVING DOUBLE BEAM PUMPING JACK

[75] Inventor: Richard K. Sutz, Scottsdale, Ariz.

[73] Assignee: Wind Baron Corporation, Phoenix, Ariz.

[21] Appl. No.: 498,307

[22] Filed: May 26, 1983

[51] Int. Cl.³ .................. F04B 17/02; F03D 3/00; F16H 21/32
[52] U.S. Cl. .................. 417/336; 416/170 R; 74/41; 74/591
[58] Field of Search .................. 417/334, 336, 374; 74/591, 41; 416/12, 13, 170 A

[56] References Cited

U.S. PATENT DOCUMENTS

| | | | |
|---|---|---|---|
| 100,946 | 3/1870 | Spear | 417/336 |
| 341,637 | 5/1886 | Carnahan | 74/41 |
| 633,619 | 9/1899 | Smith | 74/41 |
| 633,879 | 9/1899 | Miller | 74/41 |
| 717,115 | 12/1902 | Opfer | 74/41 |
| 1,786,143 | 12/1930 | Bergquist | 74/591 |
| 2,555,787 | 6/1951 | D'Amelio | 417/336 |
| 4,427,342 | 1/1984 | Sutz et al. | 416/170 A |

Primary Examiner—Carlton R. Croyle
Assistant Examiner—T. Olds
Attorney, Agent, or Firm—Jacob B. Burke

[57] ABSTRACT

This windmill head comprises a stub tower having a rotatable platform carrying a wind driven fan which drives a transmission mechanism. The mechanism has two cranks and pitman arms at opposite sides driving two rocking beams carrying counterweights. One beam is coupled to a vertical pump rod by non-rigid members to reciprocate the pump rod. The counterweights assist the beams in pulling up the pump rod and pumped load. A tail assembly tracks the wind by rotating the platform so that the fan faces the wind. The fan furls out of the wind when wind speed is excessive. A power unit may drive the transmission mechanism when wind speed is too low and high to drive the fan. The platform is carried by bearings which prevent vertical movement of the platform and components on it while the pump rod is being pulled up and pushed down, and while the counterweights are raised and lowered. The power unit can generate electric power when the wind speed is high enough to drive the fan.

7 Claims, 6 Drawing Figures

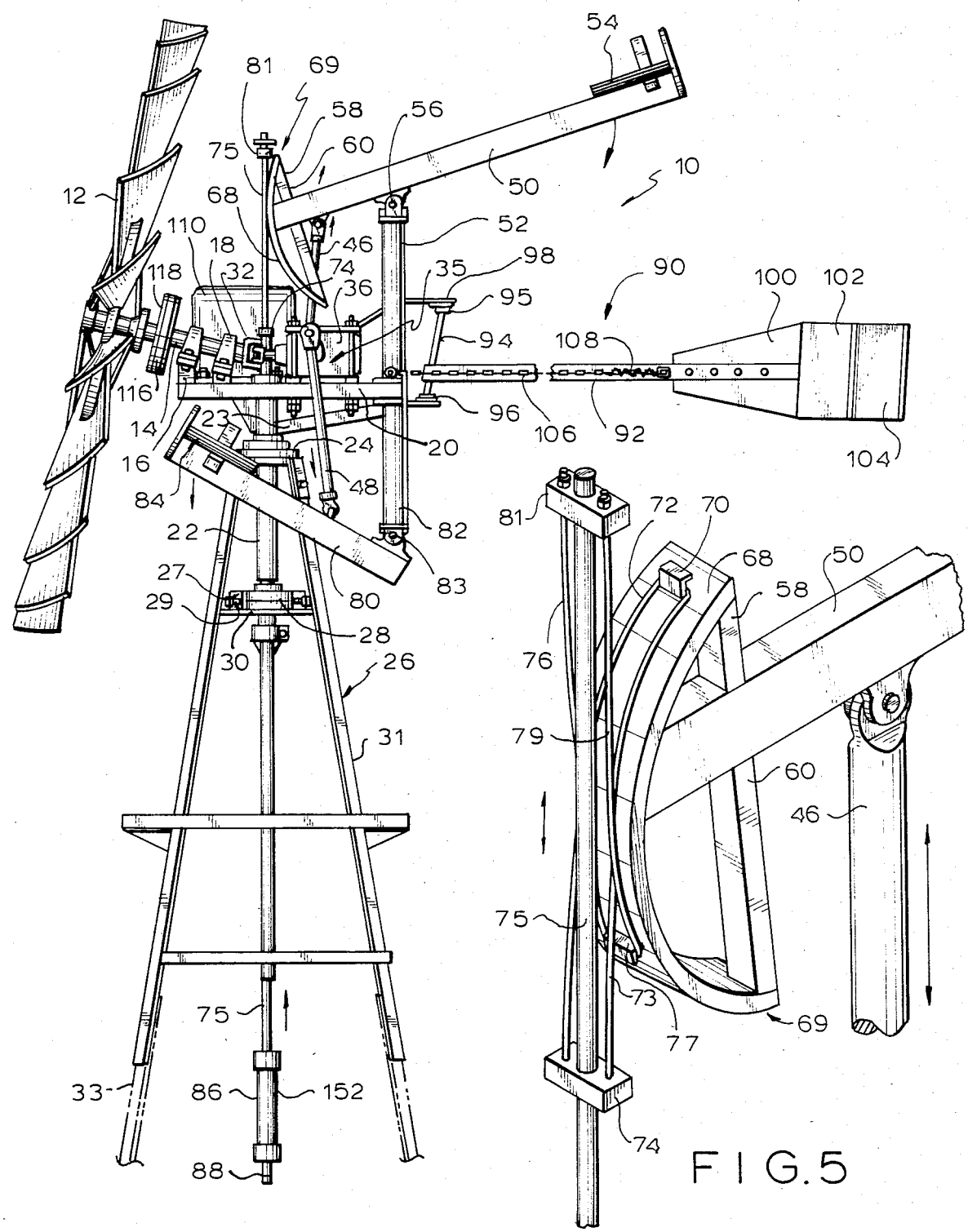

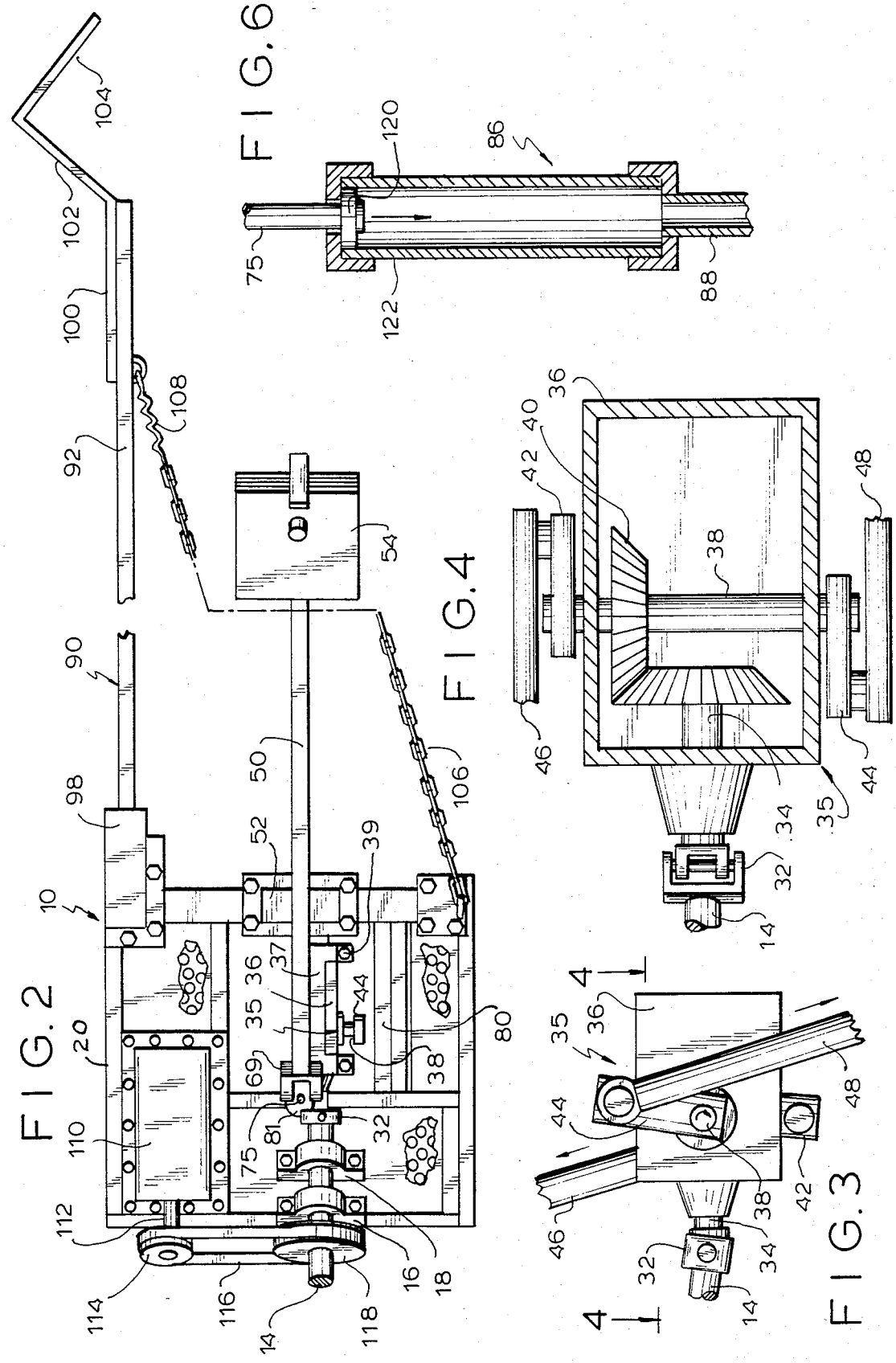

PUSH-PULL WINDMILL HEAD HAVING DOUBLE BEAM PUMPING JACK

This invention relates to the art of windmills and more particularly concerns a push-pull windmill head having a double beam pumping jack for pumping water, oil, or other liquids.

For purposes of the following description of the invention, the term "windmill head" denotes a wind machine mountable on a tower structure in an elevated position and driven by wind to generate usable mechanical power.

A "push-pull" windmill head is a wind machine which converts rotational wind generated power to reciprocating mechanical power that alternately pushes down and pulls up weights or loads so that the rotor of the wind machine is effectively driving a load at all times during each cycle of rotation.

The present invention embodies improvements over the push-pull windmill described in my prior U.S. Pat. No. 4,311,126, issued July 8, 1980, wherein the concept of a push-pull windmill was first disclosed.

The present invention embodies the following improvements among others over my prior invention:

1. The windmill head can be assembled on the ground and mounted as a unit on a conventional windmill tower.

2. The windmill head includes a transmission mechanism driving counterweighted beams that statically balance the transmission mechanism.

3. The counterbalance beams push down and pull up a pump rod via alternately acting non-rigid members such as flexible cables or jointed linkages which drive the pump rod axially vertically at all times.

4. An externally energized power unit can be mounted on the windmill head to drive the counterblance beams when wind speed is insufficient or too high to drive the windmill rotor.

5. The windmill head has an improved wind tracking tail assembly, has improved furling capabilities, and employs improved lost motion coupling between pump rod and sucker rod.

6. The push-down pull-up system is simpler and more reliable in operation.

7. The entire structure of the windmill head is simpler in construction, lighter in weight, stronger, more durable, and efficient in operation.

8. The windmill head can be manufactured more economically, is easier to install, and requires less servicing to keep in optimum operation.

9. The power unit can be a motor-generator set to generate electric power when the wind speed is sufficient to drive the windmill rotor.

Other and further features, objects and advantages of the invention will become apparent from the following detailed description taken together with the drawings, wherein:

FIG. 1 is a side elevational view of a windmill head embodying the invention, portions being omitted to simplify illustration.

FIG. 2 is a top plan view of the windmill head, with rotary multiple bladed fan and other parts removed.

FIG. 3 is an enlarged side view of the transmission mechanism and associated cranks and pitman arms.

FIG. 4 is a further enlarged horizontal sectional view taken on line 4—4 of FIG. 3.

FIG. 5 is an enlarged fragmentary perspective view of a walking beam and cables which drive a pump rod up and down.

FIG. 6 is an enlarged vertical sectional view of a slip joint for the pump rod.

Referring first to FIGS. 1 and 2, there is shown windmill head 10 including a multiple bladed rotary fan 12 mounted on a shaft 14 and disposed to face into the wind impinging on the face of the fan to turn it. Shaft 14 turns with fan 12 and is carried by two pillow blocks 16, 18 on a horizontal, turnable platform or turntable 20. This platform is a strong, relatively lightweight frame structure secured by bracket 23 on axially vertical mast pipe 22 carried by upper bearing assembly 24 at the top of tapered stub tower 25, and lower bearing assembly 28 carried by apertured plate 30 near the top of the stub tower. Mast pipe 22 is a massive, rigid structure for supporting the full weight of the platform, the components mounted thereon, and the pushing and pulling forces to which the mechanism is subjwected during operation. Legs 31 of stub tower 33 can be bolted to the top of a conventional high, windmill tower 33.

Shaft 14 is connected by a universal joint or flexible coupling 32 to the input drive shaft 34 of transmission mechanism 35; see FIG. 3. The transmission mechanism includes a gear box 36 held by a clamp 37 and bolts 39 on platform 20. The axis of input shaft 34 is disposed at right angles to output cross shaft 38; see FIG. 4. A gear train 40 operatively couples shafts 34 and 38 so that these shafts can be driven at variable speeds with a predetermined input/output speed ratio.

Brackets 27 on plate 30 hold adjustment screws 29 which center bearing assembly 28 and turnable mast pipe 22 so that the pipe and platform rotate on a precisely vertical axis.

Cross shaft 38 extends outwardly of opposite sides of the gear box. Two cranks or crank arms 42, 44 are secured to shaft 38 at opposite sides of the gear box and rotate with this shaft. The cranks extend in opposite directions and are phased approximately 180° apart. Both cranks rotate in the same direction. Connected to the outer end of crank 42 is an upwardly extending pitman arm 46. Connected to the outer end of crank 44 is a downwardly extending pitman arm 48. The two pitman arms reciprocate up and down in opposite directions at opposite sides of gear box 36.

A rigid walking beam or lever 50 is pivotally mounted on posts 52 carried by platform 20. The beam is arranged as a first class lever with counterweight 54 at the outer or rear end of the beam. The counterweight comprises a plurality of plates which can be increased or decreased in number and locked in place. Beam 50 rocks on pivot pin 56 in a vertical plane. At the forward end of the beam are bars 58, 60 supporting a circularly curved or arcuate plate 68 defining the head 69 of beam 50. At the upper end of plate 68 is secured a cleat 70 to which is attached the bight of an inverted U-shaped inelastic, flexible cable 72; see FIG. 5. The lower ends of cable legs 73 are attached to a clamp 74 spaced downwardly from the upper end of vertical pump rod 75. The vertical axis of pump rod 75 coincides with the axis of rotation of platform 20. Another inelastic, flexible U-shaped cable 76 has its bight attached to cleat 77 at the bottom end of plate 68. The upper ends of cable legs 79 are attached to a clamp 81 at the upper end of pump rod 75. The upper end of pitman arm 46 is pivotally attached to beam 50 between the inner end of the beam and pivot pin 56 which acts as a fulcrum for the rocking beam. When the beam is rocked clockwise from the position of FIG. 1, cable 72 pulls the pump rod 75 up as head 69 of bweam 50 moves up. When the beam is rocked counterclockwise, cable 76 pushes pump rod 75 vertically downward. The pump rod moves precisely vertically upward and downward while beam 50 rocks alternately in one direction and the other in a vertical plane. The cables are dressed along the curved face of head 69 so that the pump rod is always fully supported by the cables in a position tangent to the curved front face of head 69.

The lower end of pitman arm 48 is pivotally connected to the upper side of another rigid beam 80. This beam is pivotally connected by shaft 83 at its rear end to vertical posts 82 depending from and carried by platform 20. Beams 50 and 80 are disposed at opposite sides of platform 20, one above and one below the platform. Beam 80 rocks angularly in a vertical plane spaced laterally from the vertical plane of movement of beam 50. The forward end of beam 80 carries counterweight 84. Since pitman arm 48 is located between counterweight 84 and fulcrum pin 83, beam 80 operates as a third class lever. The two counterweighted beams 50 and 80 cooperate in statically balancing transmission mechanism 35. The beams rock in opposite directions i.e. while beam 50 turns clockwise to lower counterweight 54, beam 80 turns counterclockwise to lower counterweight 84 as indicated by arrows in FIG. 1. While beam 50 turns counterclockwise to raise counterweight 54, beam 80 turns clockwise to raise counterweight 84. The two counterweights 54 and 84 thus move up and down simultaneously.

Pump rod is coupled via a lost motion joint 86 to and in axial alignment with stucker rod 88 of a pump. While beam 50 is raising pump rod 75 and sucker rod 88 via cable 72, beam 80 cooperates in raising the load of liquid being pumped. Due to the phasing of the pitman arms and cranks, crank 44, pitman arm 48 and beam 80 exert the major portion of the thrust in raising the pumped liquid load during the pull-up portion of the operating cycle, while crank 42, pitman arm 46, beam 50 and cable 72 cooperate in bearing the weight of the rising pump rod, sucker rod and liquid load. In the push-down portion of the operating cycle, the force applied from output shaft 38 is applied via crank 42, pitman arm 46 and beam 50 to raise counterweight 54 while pump rod 75 is pushed down by beam 50 via cable 76 to proper starting position for lifting a liquid load. Sucker rod 88 descends by its own weight. No pushdown force is applied to the sucker rod which is a slender rod and can be bent if excessive force is applied to it. Simultaneously cross shaft 38 drives crank 44, pitman arm 48 and beam 80 during the pushdown portion of the cycle to raise counterweight 84.

In order to keep the rotary fan 12 facing into the wind, there is provided a wind tracking tail assembly 90. Fan 12 is axially offset a few inches from the rotational axis of platform 20 and pump rod 75. Tail assembly 90 includes a long horizontal rod or tail bone 92 secured to a rotatable upright rod 94 carried by upper and lower bearings 95, 96 on a bracket 98 mounted on platform 20. At the outer end of the tail assembly is a vertical, trapezoidal panel 100 secured to a vertical rectangular panel 102 disposed at an obtuse angle to panel 100. Another rectangular panel 104 is secured to panel 102 at the outer end of the tail assembly at an angle of about 90° to panel 102. This zig-zag array insures maximum turning moment of the tail assembly in tracking the wind.

Fan 12 is axially laterally offset from the rotational axis of platform 20 and pump rod 75 in a vertical plane spaced horizontally from the vertical plane of the tail assembly on the opposite side of the pump rod. Thus when wind of high speed exerting sufficiently high force impinges on fan 12, a turning moment is generated and the fan furls by turning with platform 20 to a position where the fan faces edgewise into the wind parallel to tail assembly 90, while the tail assembly remains parallel to and tracks the wind. A chain 106 may be secured at one end to platform 20 and at the other end to a spring 108 connected to tail rod 92. This exerts a restoring force to turn the platform and fan to the unfurled position of FIGS. 1 and 2, when the wind speed drops below a predetermined magnitude no longer requiring furling of the fan.

An auxiliary power unit 110 can be mounted on platform 20. This power unit can be a motor energized by electric power, oil or other fuel source. The power unit has a drive shaft 112 carrying a drive pulley 114 on which is a drive belt 116. This belt is entrained on a pulley 118 mounted on rotor shaft 14; see FIGS. 1 and 2. When the wind speed falls to a magnitude too low to turn fan 12, power unit 110 can be turned on manually or automatically to drive transmission mechanism 35, cranks 42, 44, pitman arms 46, 48, beams 50, 80, and other components as described above. During operation of power unit 110, fan 12 turns and may act as a flywheel to stabilize the power unit. The fan may also serve to cool the power unit. While power unit 110 operates, tail assembly 90 tracks the wind holding fan 12 in position facing the wind. When the wind speed rises to sufficient magnitude to turn the fan, the fan is instantly ready to drive the transmission mechanism. The power unit can then be turned off manually or automatically.

Power unit 110 can be a motor-generator set which generates electric power when mechanically driven. When the magnitude of wind speed is insufficient to drive fan 12, power unit 110 acts as a motor to drive the fan. When there is sufficient wind speed to drive the fan, power unit 110 will be driven thereby to generate electric power for energizing an external electrical load. At the same time fan 12 drives transmission mechanism 35, beams 50, 80 and pump rod 75.

In order to prevent the pump rod from pushing down on the sucker rod if the rod becomes jammed for some reason, there is provided slip joint assembly 86. This joint best shown in FIG. 6, includes outer axially vertical cylinder 122 to the lower end of which sucker rod 88 is attached. A piston 120 is attached the lower end of pump rod 75 and is movable axially in the cylinder. If the sucker rod is prevented from moving downward for some reason the pump rod can move down without applying force to the sucker rod. Also the pump rod can turn with platform 20 without turning the sucker rod since the piston can turn in the cylinder.

From the foregoing it will be apparent that the double beam pump jack described above operates in push-pull cycles continuously regardless of the speed of wind impinging on the fan. When the wind fails or is too low to turn fan 12, motor 110 takes over. When the wind speed exceeds a predetermined magnitude, the fan furls but motor 110 can take over to supply pumping power. By this arrangement the pumping of liquid need never stop regardless of wind speed.

The entire windmill head can be assembled on the ground and lifted to the top of tower 33 for mounting there. The assembly has relatively few parts as compared with prior wind machines, but it is very strong and economical to manufacture, and will provide long, troublefree service.

Although a preferred embodiment of the invention has been described, many modifications are possible without departing from the invention as recited in the appended claims.

What is claimed is:

1. A push-pull windmill head for driving a pump or the like, comprising:

a stub tower mountable in a stationary position on an elevated support;

a horizontal platform carried by said stub tower;

a transmission mechanism mounted on said platform and having
 a rotary driven input shaft, and
 a rotary driven output shaft operatively intercoupled with said input shaft and axially perpendicular thereto to convert rotary input motion at any variable speed to rotary output motion at any other variable speed in a predetermined speed ratio;

a rotary fan drivable by wind connected to said input shaft to drive the same;

a crank coupled to said output shaft;

a pitman arm coupled to said crank to convert rotary motion of said output shaft to reciprocating motion of said pitman arm;

a walking beam pivotally carried by said platform and connected to said pitman arm laterally of one side of said transmission mechanism for rocking said beam in a vertical plane parallel to said input shaft;

an axially vertical reciprocatable pump rod for lifting a pumped load;

a counterweight carried by said beam to assist said beam in pulling up said pump rod and load;

a first elongated, non-rigid member so connected between one end of said beam and said pump rod that said pump rod is pushed down precisely vertically by said member, and said counterweight is raised by said member, while said beam rocks in one direction in said vertical plane; and a second elongated, non-rigid member so connected between said one end of said beam and said pump rod that said pump rod and load are pulled up precisely vertically by said second member assisted by said counterweight descending, while said beam rocks in a direction opposite to said one direction.

2. A push-pull windmill head, as defined in claim 1, further comprising:

another crank coupled to said output shaft at the other side of said transmission mechanism and rotating approximately 180° out of phase with respect to said first named crank;

another pitman arm coupled to said other crank to convert rotary motion of said output shaft to reciprocating motion of said other pitman arm, both of said pitman arms extending longitudinally in opposite directions from said crank radially of said output shaft;

another beam pivotally carried by said platform, spaced horizontally and vertically from said first named beam, and connected to said other pitman arm laterally of said other side of said transmission mechanism for rocking said other beam in another vertical plane spaced horizontally from said first named vertical plane; and another counterweight carried by said other beam arranged so that said other beam and said other counterweight statically balance said first named beam and said first named counterweight, so that said beams rock in opposite directions, so that simultaneously said counterweights are raised, and said pump rod is pushed down to position said pump rod for lifting said load, and so that said counterweights descend simultaneously to assist said beams in pulling up said pump rod and load.

3. A push-pull windmill head as defined in claim 2, further comprising: bearing means rotatably supporting said platform to rotate on a vertical axis, said bearing means being arranged to support said platform when said pump rod and load are rising, and to hold down said platform when said counterweights are rising, said pump rod having its axis of reciprocation coinciding with said vertical axis of rotation of said platform.

4. A push-pull windmill head as defined in claim 3, further comprising a tail assembly connected to said platform to track said wind at all times, said tail assembly being so arranged that said fan always faces into said wind as long a the magnitude of speed of wind impinging on said fan remains below a predetermined magnitude.

5. A push-pull windmill head as defined in claim 4, wherein said tail assembly is pivotally connected to said platform to furl said fan by turning said platform when the magnitude of said speed of wind impinging on said fan exceeds said predetermined magnitude.

6. A push-pull windmill head as defined in claim 5, further comprising a power unit carried by said platform and operatively connected to said transmission mechanism to drive the same when said speed of wind impinging on said fan is insufficient in magnitude to drive said fan, whereby said fan is drivable as a flywheel by said power unit and is capable of cooling said power unit, whereby said tail assembly keeps said fan facing into said wind and ready to drive said transmission mechanism when said speed of wind is sufficient in magnitude to drive said fan, and whereby said power unit can drive said transmission mechanism even when said fan is furled while said speed of wind remains above said predetermined magnitude, so that said transmission mechanism can be driven and said pump rod can be reciprocated continuously regardless of the magnitude of said speed of wind impinging on said fan.

7. A push-pull windmill head as defined in claim 6, wherein said power unit is a motor-generator capable of generating electric power when driven mechanically, whereby said motor-generator will be driven by said fan to generate electric power when said speed of wind impinging on said fan is sufficient in magnitude to drive said fan but less than said predetermined magnitude, and whereby said fan will simultaneously drive said transmission mechanism to rock said beams and reciprocate said pump rod.

* * * * *